United States Patent [19]

Nachtigall

[11] 3,855,075

[45] Dec. 17, 1974

[54] METHOD OF PURIFICATION OF ACRYLAMIDE BY DISTILLATION WITH A POLYMER INHIBITOR

[75] Inventor: Guenter Willi Nachtigall, Stamford, Conn.

[73] Assignee: American Cyanamid Company, Stamford, Conn.

[22] Filed: Apr. 3, 1972

[21] Appl. No.: 240,813

[52] U.S. Cl............................ 203/8, 203/49, 203/57, 203/58, 260/561 N
[51] Int. Cl....................... B01d 3/34, C07c 103/18
[58] Field of Search................. 203/8, 9, 57, 58, 49; 260/561 W, 526 N

[56] References Cited
UNITED STATES PATENTS

| | | | |
|---|---|---|---|
| 3,274,245 | 9/1966 | Bobsein et al. | 260/561 N |
| 3,041,375 | 6/1962 | Henry | 260/526 N |
| 2,526,567 | 10/1950 | Drake et al. | 203/9 |
| 3,674,651 | 7/1972 | Otsuki et al. | 203/8 |
| 3,239,433 | 3/1966 | Costolow | 203/8 |
| 2,999,881 | 9/1961 | Glecker et al. | 260/561 N |
| 3,699,081 | 10/1972 | Iwashita et al. | 260/561 N |

Primary Examiner—Wilbur L. Bascomb, Jr.
Attorney, Agent, or Firm—Gordon L. Hart

[57] ABSTRACT

Acrylamide containing up to about 10 percent impurities is purified by distillation at reduced pressure (1–20 Torr.) with polymerization inhibitor in the liquid phase and with some oxygen kept in the vapor phase during distillation. The distillation is an efficient method for purification with near 100 percent recovery of product.

5 Claims, No Drawings

METHOD OF PURIFICATION OF ACRYLAMIDE BY DISTILLATION WITH A POLYMER INHIBITOR

The invention relates to purification of acrylamide by distillation.

In the prior art relating to production of acrylamide it has been considered impractical to distill acrylamide because of the tendency of acrylamide to polymerize at the elevated temperatures that are necessary for such distillation. With an acrylamide melt there may be considerable hazard of uncontrolled polymerization, even to the extent in extreme cases of an explosive polymerization reaction. Distillation of acrylamide from the aqueous solutions resulting from neutralization of acrylamide sulfate with ammonia has been attempted but with disappointingly low yields. The present invention in its preferred embodiments provides essentially quantitative yields of acrylamide of high purity.

According to the invention, an impure mixture of acrylamide with up to about 50 percent by weight of impurities and preferably with up to about 10 percent impurities is purified by distillation of the impure acrylamide mixture with a very small amount, preferably about 0.1 to about 2.0 percent by weight, of a polymerization inhibitor in the liquid to be distilled, and using distillation temperature in the range from about 80° to about 180°C. and preferably from about 88° to about 120°C. with pressure reduced sufficiently to boil the liquid at such temperature, usually about 1–20 Torr.

In a preferred embodiment of the invention, means for introducing and maintaining a controlled small amount of oxygen, or other gas phase polymerization inhibitor, such as NO or $NO_2$, in the vapor phase during distillation is provided. The presence of the inhibiting gas in the vapor phase in amount sufficient to provide a partial pressure of such inhibiting gas of about one to about 2.5 Torr. is effective to inhibit vapor-phase polymerization. Without an effective inhibitor in both the liquid and vapor phases, there may be a hazard due to very rapid polymerization.

EXAMPLE 1

An apparatus consisting of a 50-ml distilling flask, and an ice-cooled receiver connected to the distilling flask by means of a 10 mm I.D. glass delivery tube was used. The distilling flask was heated by means of a temperature-controlled oil bath and was provided with means for magnetic stirring. The delivery tube was wrapped in electric heating tape, which permitted control of its temperature to within about 3°C. and was equipped with a thermocouple for indicating delivery tube temperature. A vacuum pump was connected to the system through a side neck of the receiving flask. Also connected at this point was a McLeod gauge of 0–5 Torr. range. A side neck of the distilling flask was capped with a rubber septum, into which a hypodermic needle connected to a supply of oxygen could be inserted. The oxygen flow in the supply line was restricted by means of a needle valve. A needle valve was also inserted in the vacuum line so as to be able to control the rate of pressure reduction when vacuum was applied. The needle valve controlling the oxygen flow was so adjusted that, with full pumping power applied to the system and the hypodermic needle inserted, the internal pressure would come to equilibrium at 1.5 to 1.7 Torr. Acrylamide, 20.22 grams, containing 1 percent by weight of 2,5-dinitrophenol as polymerization inhibitor was charged to the distilling flask. The pressure was partially reduced, and heat was applied to melt the charge. The oxygen supply was connected and the pressure was reduced with full pumping power as oxygen was metered in. The distillation proceeded within a span of ten minutes at an oil bath temperature of 119°–121°C. and with the delivery tube temperature at 88° to 92°C. to distill acrylamide at a pressure of 1.75 Torr. The distillate which consisted of 19.59 grams of acrylamide of m.p. 84°–86°C. condensed directly as the solid in the ice-cooled receiver. The distillation residue consisted of 0.58 grams of a brown, crystalline mass, in which acrylamide was still largely present. Material balance was 99.8 percent. There were no signs of polymer formation.

EXAMPLE 2

The apparatus and procedure of Example 1 were followed except that the distillation was carried to a lesser degree of completion. Crude acrylamide, 20.27 grams containing 0.36 percent of 2,5-dinitrophenol inhibitor was charged to the distilling flask and melted under partially reduced pressure of about 10 Torr. The oxygen flow was adjusted as before, and the distillation then was carried out within 45 minutes to the extent of 65 percent under the following conditions:

| | |
|---|---|
| Oil bath temperature | 95 – 96°C. |
| Delivery tube temperature | 90 – 92°C. |
| Pressure | 1.7 – 2 Torr. |

The distillate consisted of 13.27 g of crystalline acrylamide of m.p. 85.5° – 86°C. The residue, 7.01 g of a yellow-brown crystalline mass, melted at 80° – 84°C. Material balance: 100 percent. No signs of polymerization.

EXAMPLE 3

Apparatus and procedure as in Example 1. Acrylamide, 18.54 g, containing 1 percent by weight of 2,4,6-trinitrotoluene as inhibitor was distilled within 40 minutes under the following conditions:

| | |
|---|---|
| Oil bath temperature | 100°C. |
| Delivery tube temperature | 90°C. |
| Pressure | 1.50 – 1.70 Torr. |

The distilled acrylamide weighed 18.13 g and melted at 84.5° – 86°C. The residue consisted of .41 g of a yellowish solid. Material balance: 100 percent. No signs of polymerization.

EXAMPLE 4

The procedure and apparatus of Example 1 were used, except that a 100-ml distilling flask and a 100-ml receiver were substituted to increase the capacity of the system.

Crude acrylamide, 37.49 g, containing 0.36 percent of 2,5-dinitrophenol as inhibitor was distilled within 30 minutes to the extent of 84 percent under the following conditions:

| | |
|---|---|
| Oil bath temperature | 100 – 110°C. |
| Delivery tube temperature | 88 – 91°C. |
| Pressure | 1.50 – 1.60 Torr. |

The distilled acrylamide weighed 31.77 g and melted at 84.5° – 86°C. The residue consisted of 5.59 g of a brown, crystalline, mass which was largely acrylamide. Material balance: 99.6 percent. There were no signs of polymer formation.

In the foregoing examples the polymerization inhibitors in the liquid phase were 2,5-dinitrophenol and 2,4,6-trinitrotoluene. Other suitable inhibitors for the use include nitro- and nitroso-aromatic compounds, however some will be more effective than others at a given concentration. Examples of suitable inhibitors for use in the liquid phase during the low-pressure distillation of acrylamide include, 4-nitroso-3,5-diphenyl pyrazole, 2,2'-dinitrobiphenyl, 1,4-dinitronaphthalene, 1,8-dinitronaphthalene, 4-nitro-1-naphthylamine, 1,2-naphthoquinone, 2,4-dinitrophenol, 2,6-dinotrotoluene, p-dinitrobenzene, 2,4-dinitrotoluene, 1,3,5-trinitrobenzene, m-dinitrobenzene, 1,8-naphthalene thiadiazene and N,N'-bis(p-nitrosophenyl) piperazine.

EXAMPLE 5

The procedure of Example 4 was repeated except 4-nitroso-3,5-diphenyl pyrazole was used as the liquid phase inhibitor instead of dinitrophenol. The results were essentially the same as in Example 4.

In the foregoing detailed examples the pressure was reduced more than is necessary, in order to operate at the lower end of the preferred temperature range. While it is preferable to operate at lower temperatures, the process is practical at higher temperatures up to about 180°C. when it is necessary or desired to operate with less extreme vacuum.

I claim:

1. A process of purifying a crude acrylamide mixture which consists of at least 90 percent by wt. of acrylamide with the remainder of impurities not volatile at the boiling point of the crude mixture, said process consisting essentially of melting and boiling said mixture, with about 0.1 to about 0.5 percent by wt. of a polymerization inhibitor which is not volatile at the boiling point of the crude mixture in the liquid phase of said mixture, at distillation temperature in the range from about 88°C. to about 120°C. at pressure reduced sufficiently to boil the liquid crude mixture at such temperature and with a polymerization inhibiting gas present as carrier gas and polymerization inhibitor in the vapor phase, and condensing purified acrylamide from the vapor phase.

2. A process defined by claim 1 wherein the polymerization inhibitor in the liquid phase comprises 2,5-dinitrophenol.

3. A process defined by claim 1 wherein the polymerization inhibitor in the liquid phase comprises 4-nitroso, 3,5-diphenyl pyrazole.

4. A process defined by claim 1 wherein the polymerization inhibiting gas is oxygen and the polymerization inhibitor in the liquid phase comprises 2,5-dinitrophenol.

5. A process defined by claim 1 wherein the polymerization inhibiting gas is oxygen and the polymerization inhibitor in the liquid phase comprises 4-nitroso, 3,5-diphenyl pyrazole.

* * * * *